March 2, 1926. 1,575,373
B. MARCELLUS
STOPPING AND RESTARTING MECHANISM
Filed March 21, 1924 5 Sheets-Sheet 2

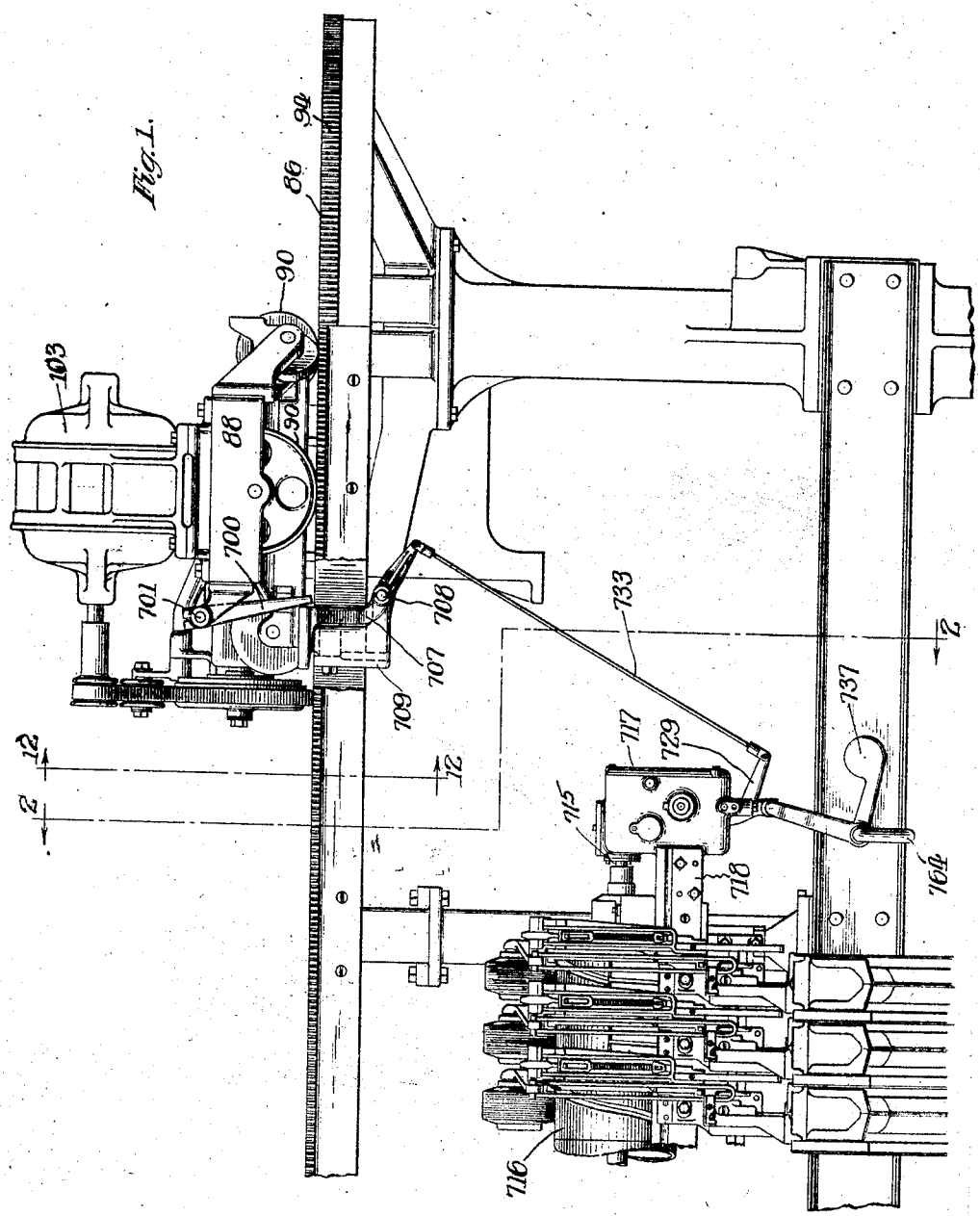

Inventor:
Brooks Marcellus,
By Crisdahl Parker Karlson
Attys.

March 2, 1926.                               1,575,373
B. MARCELLUS
STOPPING AND RESTARTING MECHANISM
Filed March 21, 1924    5 Sheets-Sheet 3

Inventor:
Brooks Marcellus,
By Chindahl Parker Carlson
Atty's.

March 2, 1926.

B. MARCELLUS 1,575,373

STOPPING AND RESTARTING MECHANISM

Filed March 21, 1924  5 Sheets-Sheet 4

Inventor:
Brooks Marcellus,
By Churchill Clark Radon
Att'ys.

March 2, 1926.  1,575,373
B. MARCELLUS
STOPPING AND RESTARTING MECHANISM
Filed March 21, 1924     5 Sheets-Sheet 5

Inventor:
Brooks Marcellus,
By Crindahl Parker & Carlson
Att'ys.

Patented Mar. 2, 1926.

1,575,373

UNITED STATES PATENT OFFICE.

BROOKS MARCELLUS, OF ROCKFORD, ILLINOIS, ASSIGNOR TO BARBER-COLMAN COMPANY, OF ROCKFORD, ILLINOIS, A CORPORATION OF ILLINOIS.

STOPPING AND RESTARTING MECHANISM.

Application filed March 21, 1924. Serial No. 700,785.

*To all whom it may concern:*

Be it known that I, BROOKS MARCELLUS, a citizen of the United States, residing at Rockford, in the county of Winnebago and State of Illinois, have invented a certain new and useful Stopping and Restarting Mechanism, of which the following is a specification.

The invention relates to a mechanism for stopping and restarting a traveling carriage or the like, and while it is capable of general application it is especially adapted for use upon winders of the type shown in the patent to Colman No. 1,267,977 dated May 28, 1918. In said patent there is disclosed a traveling winder-tending mechanism arranged to be automatically stopped upon the completion of each round trip and then started after an idle period of predetermined duration. The stopping and restarting means included switches for controlling the flow of current to the actuating motor.

In the patent to Colman, No. 1,446,451, dated February 27, 1923, there is disclosed a mechanically operating stopping and restarting mechanism adapted to permit the motor which actuates the winder tender mechanism to operate continuously, thus eliminating the necessity of starting the motor under load. The object of the present invention is to produce a mechanically operating stopping and restarting mechanism which is in the nature of an improvement upon the mechanism described and claimed in said Colman Patent No. 1,446,451.

Figure 3:
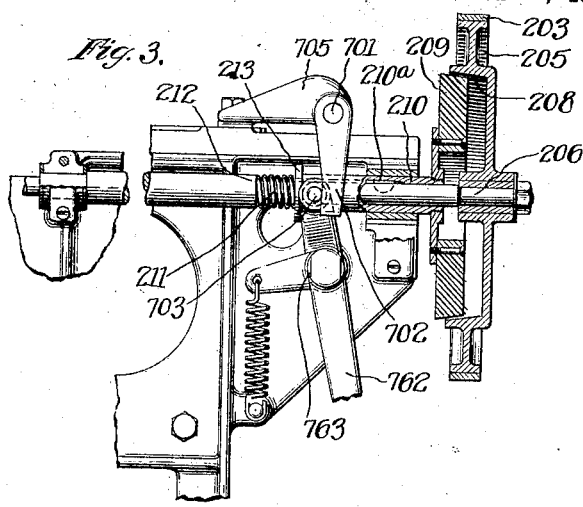
Figure 4:
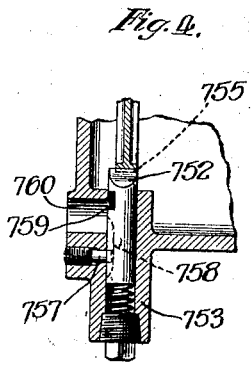
Figure 2:
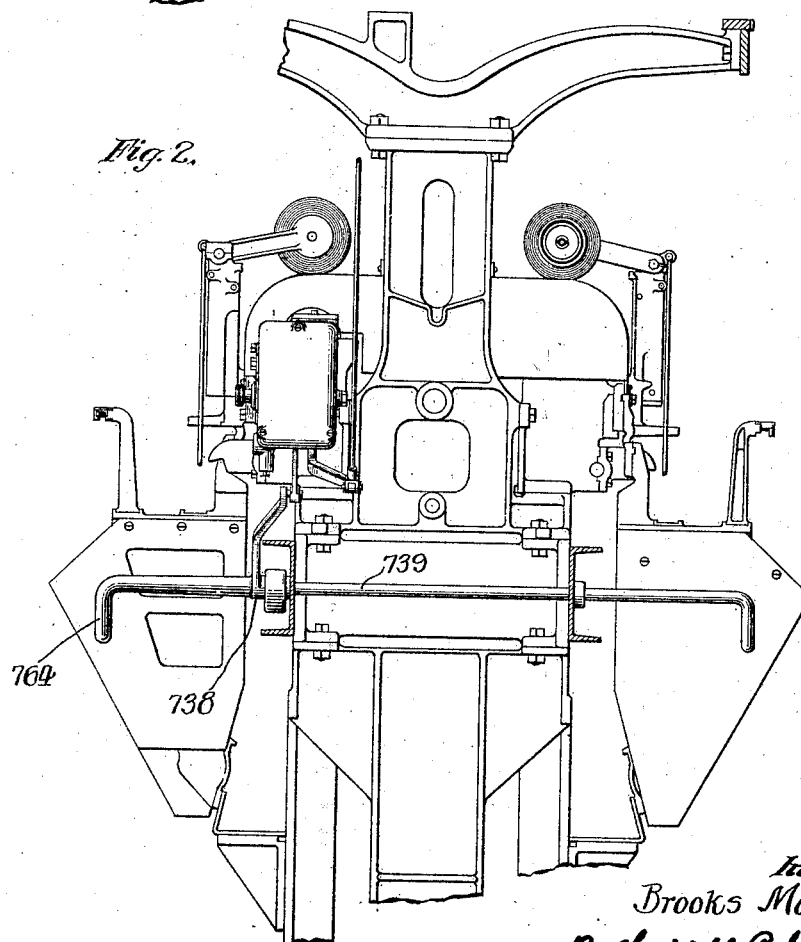
Figure 5:
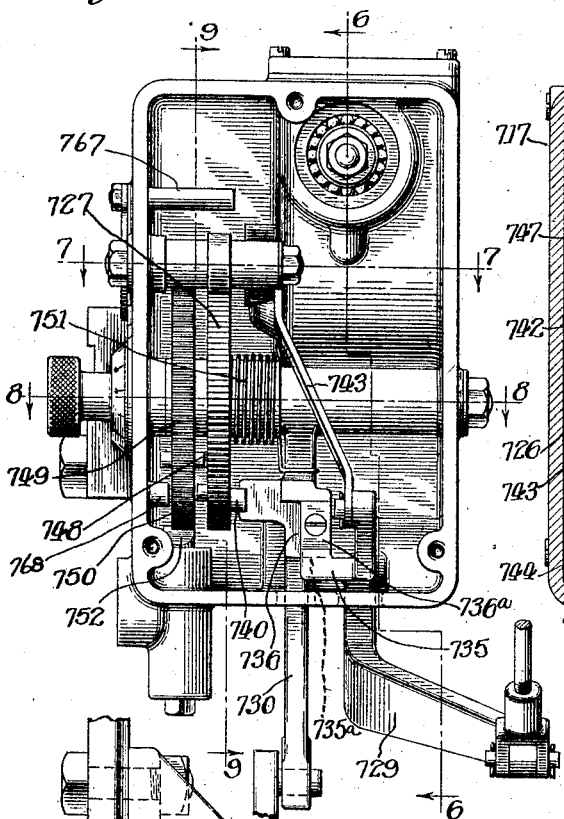
Figure 6:
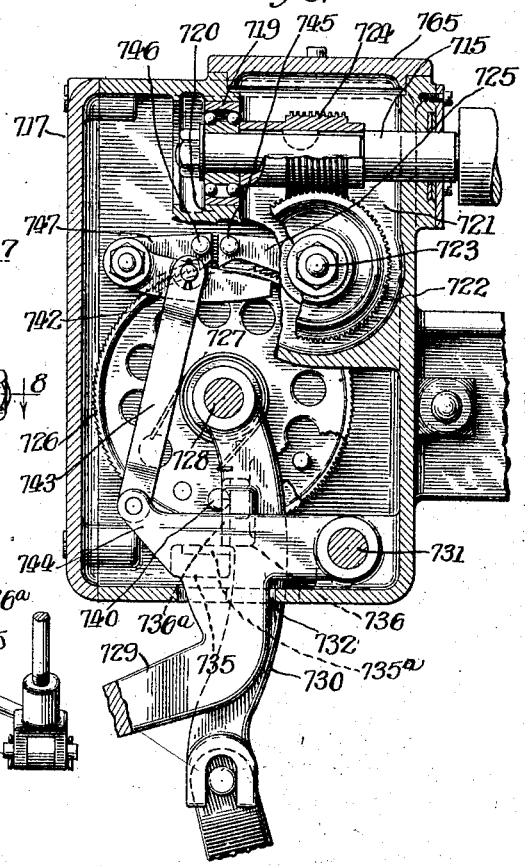
Figure 7:
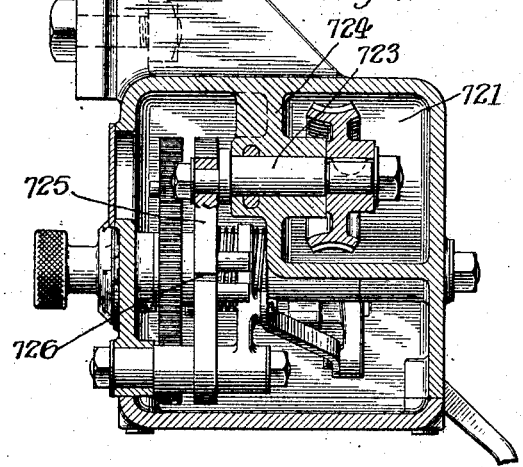
Figure 8:
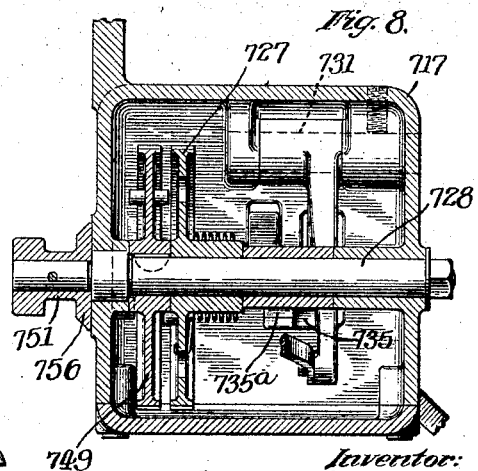
Figure 9:
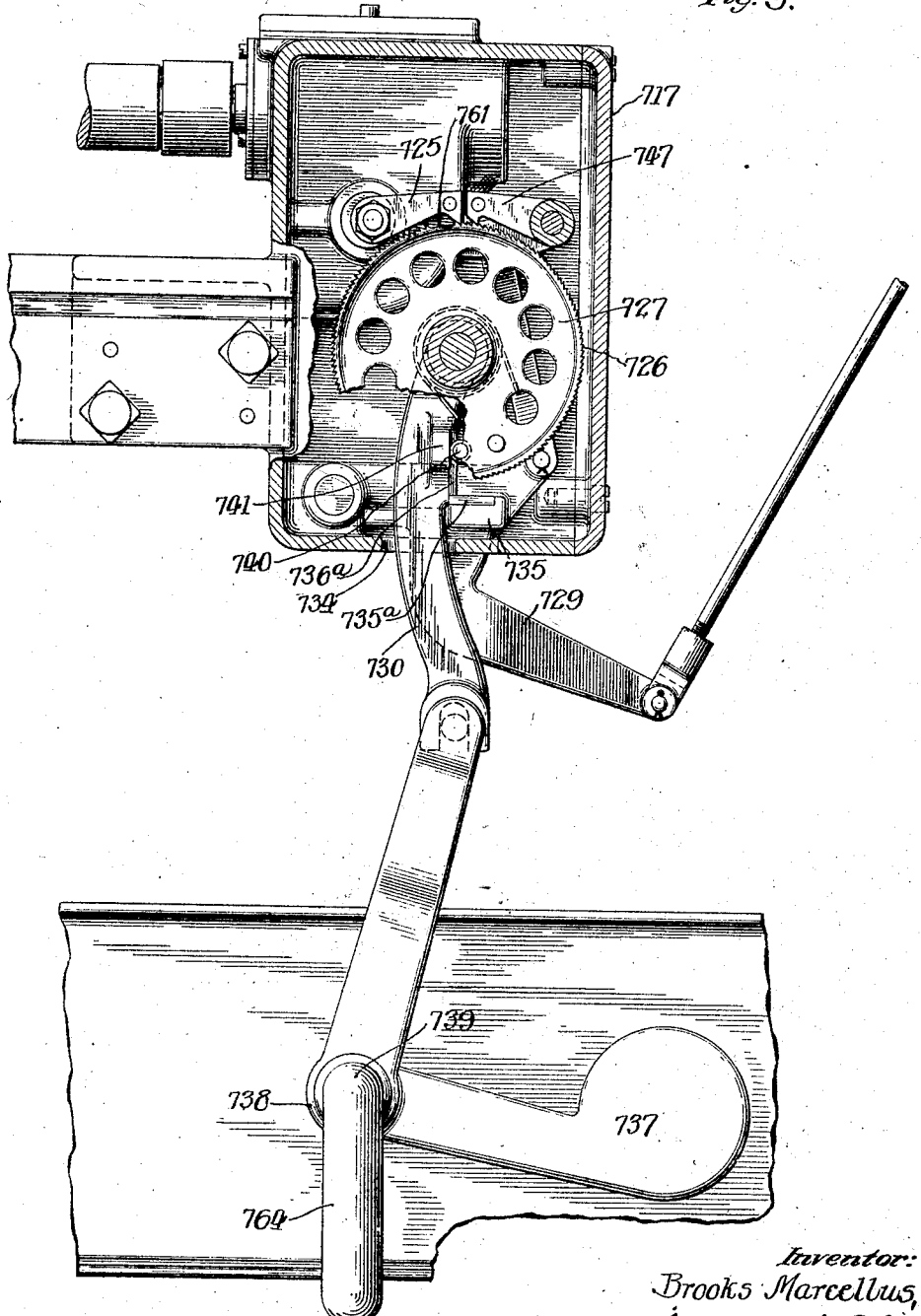
Figure 10:
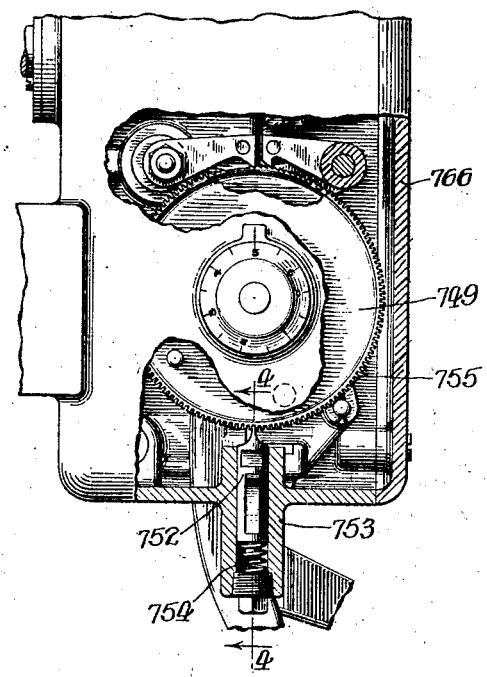
Figure 11:
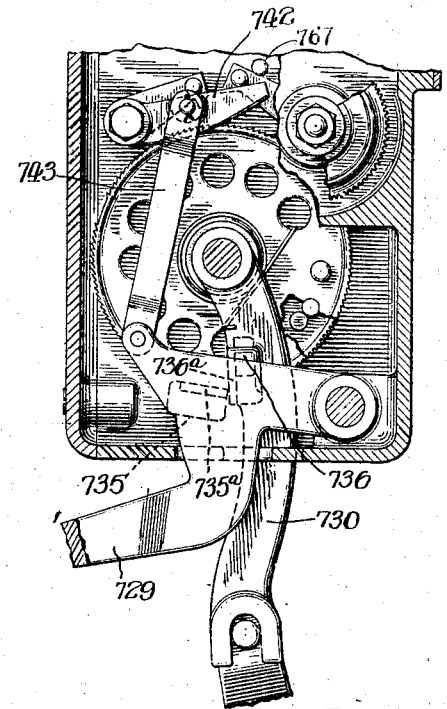
Figure 12:
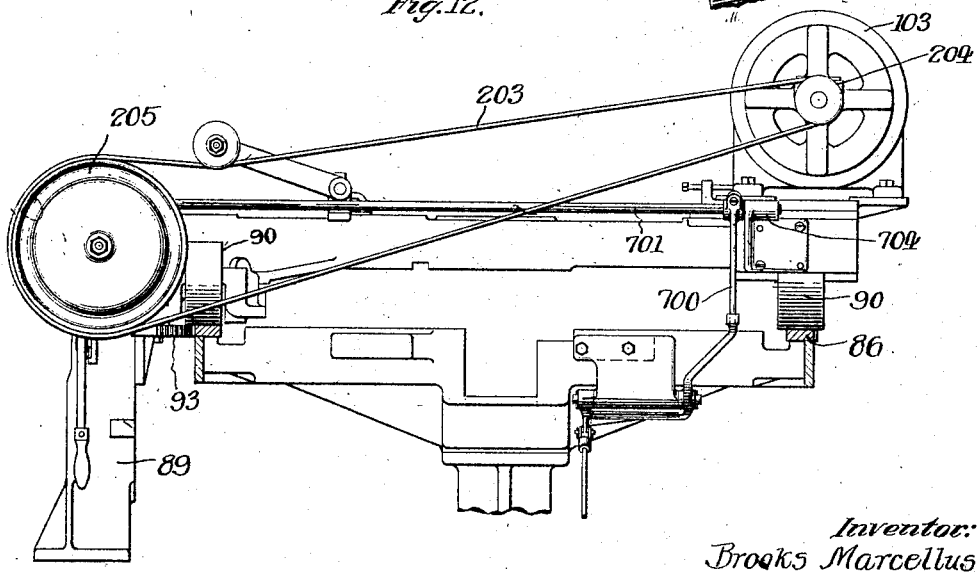

In the accompanying drawings Figure 1 is a fragmentary front elevational view of a winder showing a winder-tending mechanism in the position which it occupies when stopped by my improved stopping and restarting mechanism. Fig. 2 is a fragmentary sectional view taken in the plane of line 2—2 of Fig. 1. Fig. 3 is a fragmentary elevational section illustrating the clutch and associated parts controlling the travel of the tending mechanism. Fig. 4 is a fragmentary sectional view illustrating a detail of construction. Fig. 5 is an end view of the clutch controlling mechanism, the cover plate of the housing being removed and the rod extending to the clutch operating device being shown in section. Fig. 6 is a fragmentary vertical sectional view taken substantially in the plane of line 6—6 of Fig. 5. Figs. 7 and 8 are fragmentary horizontal sectional views taken respectively in the planes of lines 7—7 and 8—8 of Fig. 5. Fig. 9 is a fragmentary vertical sectional view taken in the plane of line 9—9 of Fig. 5 and showing the means which operates to restore certain of the parts to normal position after the tending mechanism has been restarted. Fig. 10 is a fragmentary front elevational view of the controller mechanism with the housing therefor broken away and shown in section to illustrate details of construction. Fig. 11 is a view somewhat similar to Fig. 6, but showing the parts in a different operative relation. Fig. 12 is a fragmentary sectional view taken approximately in line of 12—12 of Fig. 1.

My invention is herein shown as embodied in a machine generally similar to the one disclosed in the above mentioned Patent No. 1,267,977. Reference may be made to said patent for an understanding of the construction and operation of the mechanism co-operating with that herein illustrated.

Briefly stated the winder embodies an endless elevated rail 86 (Figs. 1 and 12) consisting of two straight parallel portions and semi-circular end sections. The winder-tending mechanism is arranged to travel on said endless rail and thus comprises a carriage 88 having a depending frame 89 (Fig. 12) at one end. The carriage is equipped with rollers 90 arranged to run upon the rail 86 and at the outer edge of the rail 86 there is an endless rack 94 with which a driving pinion 93 of the winder tender mechanism is arranged to mesh. When the winder tending mechanism reaches one end of the winder and the rollers 90 pass onto the semi-circular sections at that end of the machine, the carriage 88 turns through an arc of 180 degrees.

The winder tending mechanism has mounted thereon an electric motor 103 (Figs. 1 and 12) from which power is derived to actuate the tending mechanism and to cause it to travel on the rail 86. Power is communicated from the motor 103 to the pinion 93 and to the mechanisms that operate on the winder units, by means of a belt 203 running from a pulley 204 on the motor armature shaft and over a pulley 205 rotatably mounted upon a shaft 206 (Fig. 3). The rear side of the pulley is provided with a tapered friction surface 208 adapted to receive a correspondingly tapered friction clutch member 209 fixed upon a sleeve 210 which is slidable upon the shaft 206. The sleeve, however, is connected to rotate with the shaft by means of a spline 210ª. An expansion spring 211 surrounding the shaft and interposed between a shouder 212 thereon and flange 213 on the sleeve, tends normally to hold the clutch member 209 in engagement with the clutch member 208.

It is desirable that the winder tending mechanism shall be ready to operate upon the successive winding units promptly after the bobbins exhaust. The time required to empty a bobbin varies with the amount of yarn thereon. It is therefore desirable that the travel of the tending mechanism shall be subject to control so that it may be varied when changes are made in the character of the yarn being wound. The tending mechanism is, therefore, interrupted in its travel at one end of the winder framework after each round trip and caused to wait for such a length of time that the active bobbin of the next unit to be operated upon shall almost certainly be exhausted before the winder tending mechanism reaches it. The length of the stoppage of the tending mechanism is predetermined in accordance with the length of time necessary to unwind the yarn from a maximum bobbin of the kind being handled regularly on the machine.

At the end of each complete round trip of the tending mechanism, an element carried by the tending mechanism is caused to disengage the clutch 208—209, thereby suspending the travel of the carriage 88. The element referred to is in the present instance in the form of an arm 700 (Fig. 1) which is fast upon the outer end of a horizontal rock shaft 701 (Fig. 12) mounted on the carriage 88. Upon the opposite or inner end of said shaft 701 is a second arm 702 (Fig. 3) which lies in contact with a pin 703 carried by the upper end of one arm of a spring controlled bell crank 703ª. The shaft 701, it will be seen, is mounted to turn in suitable brackets 704 and 705 (Figs. 3 and 12).

In the travel of the carriage 88 the lower end of the arm 700 is carried into contact with the upper end of a lever 707 which is pivoted at 708 upon a bracket 709 suitably supported by the winder frame work. It will be observed that if the lever 707 is held stationary the arm 700 engaging therewith will be swung to rock the shaft 701 and thereby actuate the arm 702 to disengage the clutch 208—209, with the result that the travel of the carriage is interrupted. Also it will be noted that when the lever 707 is permitted to swing under the pressure of the clutch spring 211 transmitted through the arm 700, the latter will pass over the lever and then resume its normal position under the action of said clutch spring, thus effecting the re-engagement of the clutch 208—209. I have provided means for controlling the lever 707 in order that it may in turn control the operation of the arm 700 and the consequent operation of the clutch, and this means provides a timing mechanism whereby the duration of the period during which the winder tending mechanism is at rest may be regulated as desired. Such means will now be described:

The shaft 715 (Figs. 1 and 6) is driven in any suitable manner, as by being directly connected to the cam shaft 716 (Fig. 1) of the winder. Said shaft 715 is journaled in the upper end of a housing 717 which is preferably mounted upon the end of the unit-carrying bar 718 of the winder. The end of the shaft 715 (Fig. 6) may be mounted in a roller bearing 719 suitably supported in an inner wall 720 forming part of an oil chamber 721. In said chamber is mounted a worm wheel 722 on a shaft 723, and meshing with said wheel is a worm 724 on the driving shaft 715. The shaft 723 is journaled on another wall 724 of the oil chamber and projects through its wall as shown in Fig. 7. Eccentrically mounted on the shaft 723 is a pawl 725 which is arranged to engage with ratchet teeth 726 on the periphery of a disk 727. The latter is journaled upon a shaft 728 (Fig. 8) which in turn is journaled in opposite walls of the housing 717.

When the arm 700 on the tending mechanism engages the upper end of the lever 707, the force of the clutch spring 211 is transmitted to said lever in a manner such as to tend to swing the lever on its pivot 708 (Fig. 1). For holding the lever against such swinging movement until the expiration of the period allowed for the tending mechanism to remain at rest, I provide means, controlled by the operation of the disk 727, for locking the lever 707 against movement for the arm 700. This means comprises two interlocking parts 729 and 730, one of which, 729, is in the form of a lever pivoted between its ends on a shaft 731 (Fig. 6) mounted in the lower portion of the housing 717. One arm of this lever depends through a slot 732 in the bottom of the housing, and is bent at substantially right angles for connection with the rod 733, the opposite end of which is connected to the lower end of the lever 707. The other one of said parts is in the form of an arm mounted on the shaft 728 and depending through a slot 734 (Fig. 9) in the bottom wall of the housing. The lever 729 and the arm 730 are arranged in juxtaposition within the housing and the two parts are provided respectively with projections 735 and 736 (Figs. 5, 6 and 11) normally interengaged in overlying relation and having hardened face plates 735ᵃ and 736ᵃ. The projection 736 on the arm 730 is normally held in engagement with the projection 735 on the lever 729 by means of a weight 737 (Fig. 9) fixed to a bellcrank lever 738 mounted on a rock shaft 739 journalled in the framework. The weight 737 is carried by one arm of said lever, and the other arm is pivotally connected to the lower end of the arm 730.

The engagement of the projections 735, 736 is of such a character that when the parts are in the position shown in Fig. 9, upward movement of the lower end of the lever 729 by the force of the clutch spring, is prevented. Consequently, until the interlocking parts are disengaged the clutch 208, 209 is disengaged, causing the winder tending mechanism to remain at rest. It is the function of the disk 727 slowly actuated by the pawl and ratchet 725—726 to disengage the parts 729—730 after the expiration of the predetermined period allowed for the tending mechanism to remain at rest. This is accomplished by means of a stud 740 (Fig. 6) carried by the disk 727 and arranged to engage a lug 741 on the arm 730, the arrangement being such that in the rotation of the disk the stud in its travel engages the lug 741 and swings the arm 730 to carry the projection 735 free of the projection 736 (Fig. 6). When the projections are thus disengaged, it will be apparent, the lever 729 is free to swing under the action of the clutch spring 211, so that the lever 707 is actuated to release the arm 700 and permit the engagement of the clutch to start the winder-tending mechanism.

Upon such operation of the lever 729, the movement of the disk by the pawl and ratchet 725, 726 is interrupted and the disk restored to its initial or starting position. The means for interrupting the operation of the disk comprises a pivoted finger 742 connected by means of a link 743 with an arm 744 on the lever 729. The finger 742 is arranged to engage a stud 745 on the free end of the pawl 725, and also a stud 746 on the free end of a holding pawl 747.

The initial position of the disk 727 is determined by a stop pin 748 on a second disk 749, the disk 727 having a co-acting stop pin 750 on the side opposite the stud 740 for this purpose. Upon the disengagement of the pawls 725, 747 from the ratchet teeth 726, the disk is reversely rotated until the stop pin 750 engages with the stop pin 748, by means of a torsion spring 751 coiled about the hub of the disk 727 and having one end anchored to the disk and its opposite end to the arm 730.

It will be understood that the time at which the lug 741 disengages the interlocking parts 729, 730 depends upon the location of the stop pin 748. In order that the position of said stop pin may conveniently be altered when a change is made in the character of the yarn masses to be unwound, the disk 749 is arranged to be adjusted by means of a turn button 751 mounted on a forward extension of the shaft 728, the disk 749 being keyed to said shaft so as to be rotatable by the turn button. Normally the disk 749 is held against rotation by a detent 752 (Figs. 4, 5 and 10) mounted in a vertical bearing 753 in the bottom wall of the housing and pressed by means of a spring 754 into engagement with teeth 755 on the periphery of the disk. The turn-button 751 preferably has rigid therewith a dial 756 co-acting with a suitable point on the face of the housing through which the shaft 728 extends, to facilitate the adjustment of the stop 748 in accordance with the period which it may be desired to provide for the tending mechanism to remain at rest. As shown in Fig. 4 the detent 752 is held against rotation by means of a set screw 757 entered into a vertical groove 758 in one face of the detent. To release the detent from the teeth 755 it has a notch 759 therein to which access may be had through an opening 760 in one wall of the tubular member 753.

It may sometimes happen that the winder tending mechanism will not complete its travel by the time the stud 740 on the controlling disk operates to disengage the parts 729, 730. In such event it will be apparent, the clutch spring is not placed under tension so that the lever 729 would not be operated to disengage the pawl 725 from the ratchet 726. As a consequence the stud 740 would continue to operate and obviously the mechanism would suffer damage. To avoid this possibility I provide a gap 761 in the ratchet teeth of a length equal to, say seven or eight teeth, and this gap is positioned with respect to the stud 740 so that after the latter has operated to move the projection 735 clear of the projection 736 the gap in the teeth will move into position below the pawl 725, rendering it inoperative to turn the disk further.

As shown in Figs. 3 and 12, I preferably provide for the manual operation of the clutch 208, 209 by means of a hand lever 762 which is rigid with the bell crank 703ᵃ pivoted at 763 in the framework. Also I provide for the manual tripping of the timer mechanism when it is desired to start the traveling carriage without waiting for the expiration of the predetermined rest period, this manual operation of the tripping mechanism being accomplished by means of hand lever 764 (Fig. 2) rigid with the rock shaft 739.

It will be understood that the chamber 721 containing the worm gearing 722, 724, is partially filled with a suitable lubricant introduced through the top which has a removable cover plate 765. Also it will be apparent access to the mechanism in the housing may be had through a removable side wall or cover plate 766 (Fig. 10).

By way of summary the operation is as follows:

The winder-tending mechanism (Fig. 1) when nearing the completion of a round trip, and preliminary to starting upon a new set of units, is brought to rest by the operation of the arm 700 engaging the lever 707 and actuating the rock shaft 701, arm 702 thereon, sleeve 210 and clutch 208, 209. The lever 707 is normally held against swinging movement by the arm 700, by interlocking parts 729, 730 (Fig. 9) having interengaging projections 735, 736. The disk 727 is meanwhile being rotated at a slow speed by means of the pawl and ratchet mechanism 725, 726, and after the expiration of a predetermined length of time the stud 740 on the disk strikes the lug 741 on the arm 730 and carries the projection 735 clear of the projection 736. The lever 729 is now free to move under the action of the clutch spring 211 transmitted through the rock shaft 701, arm 700 and lever 707, whereupon the clutch 208, 209 becomes re-engaged and the winder tending mechanism restarted for another round trip. Simultaneously with the release of the arm 700 by the operation of the lever 707, the rotation of the disk 727 is interrupted by the movement of the pawl 725 by the finger 742 and link 743, which latter is connected to the lever 729. Finally the spring 751 acts to restore the disk 727 to its initial position as determined by the position of the stop pin 748; and the arm 700 having passed over the lever 707, the lever 729 moves by the action of gravity into its initial position while the arm 730 is swung by the weight 737 causing the projections 735 and 736 to re-engage and lock the parts together for the next operation.

To limit the upward movement of the pawl 725, a pin 767 is provided (Fig. 5). This pin projects inwardly from the front wall of the housing.

The adjustment of the stop pin 748 may be facilitated by the provision of a stud 768 with which said pin is arranged to engage, the arrangement being such that the stud serves as a zero stop to assist in determining the position of the disk 749.

I claim as my invention:

1. In a winder, the combination of a traveling carriage, a control element therefor, means acting upon the control element to cause it to stop the carriage at a predetermined point in its travel, and means operating to cause the control element to permit the carriage to resume its travel after the lapse of a predetermined interval including a timing member and a part actuated by said member as the latter moves in one direction, and means operable in the movement of said part to effect a return of the timing member to its initial starting position.

2. The combination of a traveling carriage, and means for stopping the carriage and restarting it after the lapse of a predetermined interval including a control element, means adapted to hold the control element in a position to stop the carriage, means for rendering said holding means inoperative so as to restart the carriage including a timing disk arranged to be driven in one direction at a low rate of speed, and means operable to restore the timing disk to an initial or starting position as the control element operates to restart the carriage.

3. The combination of a traveling carriage, means for actuating the carriage including a spring actuated clutch, a lever mounted on a fixed axis, a member on said carriage adapted to engage with said lever to operate the clutch and thereby interrupt the travel of the carriage, and means for holding said lever against movement by the clutch spring including a second lever connected with the first lever, and positively acting means normally holding the second lever against swinging movement.

4. The combination of a traveling carriage, means for stopping the carriage in its travel, including a controlling element on the carriage, a member mounted to turn on a stationary axis and adapted to be engaged by said element, a lever pivotally connected to said member, and means for controlling the operation of said lever including a locking member, a constantly driven shaft, and means actuated by said shaft to move said locking member.

5. In a winder, the combination of a frame, a housing stationarily mounted below the frame, a lever mounted to swing in said housing and having means normally locking it against movement, a constantly driven shaft journalled in the housing, means actuated by said shaft for releasing the lever to swinging movement, and means connected with said lever adapted when the lever is held against movement by its controlling means to stop the operation of a traveling carriage on the frame.

6. In a winder, means for stopping and restarting a traveling carriage including a pivoted member, and means for holding said lever against swinging movement during a predetermined interval of time including an arm normally in interlocking engagement with said lever, a disk for moving said arm out of its holding position, and means for actuating said disk through a predetermined range of travel.

7. In a winder, means for stopping and restarting a traveling carriage including a pivoted member, and means for holding said lever against swinging movement during a predetermined interval of time including an arm normally in interlocking engagement with said lever, a disk for moving said arm out of its holding position, and a pawl-and-ratchet mechanism for actuating said disk, said lever being operable in its movement when released by the holding member to render the pawl and ratchet mechanism inoperative.

8. The combination of means for controlling the operation of a traveling carriage, including a pivoted member, and means for controlling the movement of said member including a constantly driven shaft, a disk arranged to be driven from said shaft, a lever connected with said member, means controlled by said disk in its operation adapted normally to hold said lever against pivotal movement, and means controlled by the operation of said lever for interrupting the travel of said disk.

9. The combination with a control element, of means tending to hold said element against movement during a predetermined period of time including a lever, an arm normally in interlocking engagement with said lever, a disk arranged to move said arm into an inoperative position, a pawl and ratchet mechanism for moving said disk in one direction and a spring for moving the disk in the opposite direction, and means operable as the arm moves into its inoperative position to render the pawl and ratchet mechanism inoperative and permit the operation of the disk by its spring.

10. The combination with a control element and means tending to move said element in one direction, of means preventing such movement for a predetermined length of time comprising a lever operatively connected with said element, a pivoted arm, means on said lever and said arm normally tending to interlock to hold the lever against movement, a constantly rotating shaft, and means driven by said shaft at a reduced speed adapted to swing said arm to disengage said interlocking means.

11. The combination with a control element and means tending to move said element in one direction, of means preventing such movement for a predetermined length of time comprising a pivoted member operatively connected with said element, a second pivoted member, means effecting an interlocking engagement between said members, a constantly driven shaft, a second shaft having a gearing connection with the first shaft, a pawl mounted eccentrically on the second shaft, a disk having ratchet teeth adapted for engagement by said pawl, and means on said disk adapted to actuate one of said members to disengage the other one of said members.

12. The combination of a control element and means tending to move said element in one direction, of means for preventing such movement for a predetermined length of time, comprising a pivoted member operatively connected with said element, a second pivoted member, means effecting an interlocking engagement between said members, a constantly driven shaft, a second shaft having a gearing connection with the first shaft, a pawl mounted eccentrically on the second shaft, a disk having ratchet teeth adapted for engagement with said pawl, means on said disk adapted to actuate one of said members to disengage the other one of said members therefrom, and means connecting one of said members with said pawl to move it into inoperative position upon the disengagement of the two members.

13. The combination with a control element and means tending to move said element in one direction, of means preventing such movement for a predetermined length of time comprising a pivoted member operatively connected with said element, means normally holding said member against movement, and means for rendering said holding means inoperative comprising a rotatable part, a spring tending to rotate said part in one direction, a pawl and ratchet mechanism tending to rotate said part in the opposite direction, and means operable in the movement of said member to render the pawl and ratchet mechanism inoperative.

14. The combination with a control element and means tending to move said element in one direction, of means preventing such movement for a predetermined length of time comprising a pivoted member, means tending to hold said member against movement including a pivoted arm having yielding means normally holding it in operative relation to said member, automatic mechanism for swinging the arm after the expiration of a predetermined period of time whereby to release said member, and means manually operable to swing the arm.

15. The combination with a control element and means tending to move said element in one direction, of means preventing such movement for a predetermined length of time comprising a pivoted member operatively connected with said element, means normally tending to hold said member against movement, and automatically operating mechanism for rendering said holding means ineffective comprising a disk, means for driving the disk in one direction at a slow speed, spring means tending to move the disk in an opposite direction, and adjustable means for limiting the movement of the disk by the spring means comprising a second disk mounted co-axially with respect to the first disk, means normally holding said second disk against rotation, and means for rotating the second disk manually indepenent of the first disk.

16. The combination with a control element and means tending to move said element in one direction, of means preventing such movement for a predetermined length of time comprising a pivoted member, and means automatically operable to release said member for movement after the expiration of the predetermined period of time comprising a disk, a shaft on which said disk is mounted to turn, means for driving the disk in one direction at a low speed, spring means tending to rotate the disk in the opposite direction, means operable upon the movement of said member to release the disk for operation by said spring means, and adjustable means for determining the extent of movement of the disk by the spring means comprising a second disk rigid with said shaft and means for manually rotating the shaft.

17. The combination with a control element and means tending to move said element in one direction, of means for preventing such movement for a predetermined length of time comprising a pivoted member, and means automatically operable to release said member for movement after the expiration of the predetermined period of time, said means comprising a disk, a shaft on which said disk is mounted to turn, means for driving the disk in one direction at a low speed, spring means tending to rotate the disk in an opposite direction, means operable upon the movement of said member to release the disk for operation by said spring means, and adjustable means for determining the extent of movement of the disk by the spring means comprising a second disk rigid with said shaft, means for manually rotating the shaft, and means normally tending to hold said disk against movement including a detent and teeth on the second disk for engagement by said detent.

18. The combination with a part to be moved, of a rotary member operable to move said part, means tending to move said member in one direction, a spring tending to move said member in the opposite direction, a toothed disk, means for holding said disk against operation, means carried by said disk for determining the extent of movement of said rotary member by said spring, and a turn button rigid with said disk operable to rotate it, said detent being movable to permit the rotation of said disk by said button.

19. The combination of a housing, a shaft mounted to turn in said housing, a second shaft journaled in the housing and constantly driven, a disk journaled on the first-mentioned shaft, means in said housing operatively connected with the second shaft for rotating said disk in one direction, spring means tending to rotate the disk in the opposite direction, a second disk fixed upon the first-mentioned shaft within the housing, a dial rigid with the first shaft upon the outer side of the housing, means on the second disk adapted to limit the movement of the first disk by said spring means, and a releasable detent for holding the second disk in a fixed position.

20. The combination of a housing having a chamber in the upper portion thereof, a constantly driven shaft journaled in the walls of said chamber, a second shaft also journaled in one wall of the chamber, reduction gearing between said shafts within the chamber, said second shaft projecting through the chamber into the housing, a ratchet disk mounted to turn in the housing, a pawl eccentrically mounted on said second shaft and adapted to engage with said disk to rotate it in one direction, and a part arranged to be operated in the travel of said disk after the expiration of a predetermined length of time.

21. The combination of a housing having a chamber in the upper portion thereof, a constantly driven shaft journaled in the walls of said chamber, a second shaft also journaled in one wall of the chamber, reduction gearing between said shafts within the chamber, said second shaft projecting through the chamber into the housing, a ratchet disk mounted to turn in the housing, a pawl eccentrically mounted on said second shaft and adapted to engage with said disk to rotate it in one direction, a part arranged to be operated in the travel of said disk after the expiration of a predetermined length of time, means operatively associated with said part adapted in its movement to disengage said pawl from the ratchet disk, and means for restoring the ratchet disk to an initial position when released by the movement of said pawl.

22. In a winder, the combination of a traveling carriage, means operable to interrupt the travel of the carriage for a predetermined length of time comprising a constantly driven shaft, a rotary member, a second shaft having a gearing connection with the first shaft for operation thereby at a reduced speed, a pawl and ratchet mechanism actuated by the second shaft for rotating said rotary member in one direction, spring means tending to rotate said member in the opposite direction, a pivoted member, means tending to hold said pivoted member against movement, means operable by said disk to render said holding means inoperative, and means operating when the pivoted member is released by said holding means to restart the carriage in its travel.

23. In a winder, the combination of a traveling carriage, means including a control element operable as the carriage approaches a predetermined position to interrupt its movement, and means automatically operable to cause the carriage to resume its travel after the expiration of a predetermined period of time comprising a rotary member and a pawl and ratchet mechanism for rotating said member at a low speed whereby to effect the operation of the control element after the lapse of a predetermined time.

24. The combination of a travelling carriage and means for stopping the carriage and restarting it after the lapse of a predetermined interval including a control element, means adapted to hold the control element in a position to stop the carriage including a locking member, and means for rendering said holding means inoperative so as to restart the carriage including a timing device arranged to operate in one direction at a low rate of speed and acting at a predetermined point in such operation to engage said locking member to move it.

25. In an apparatus of the character described, the combination with a control element of a timing device for governing the operation of the control element at a predetermined time, a pair of normally interlocking members, one of which is operatively associated with said control element and the other of which is arranged to be engaged by said timing device for movement thereby into inoperative position.

In testimony whereof, I have hereunto affixed my signature.

BROOKS MARCELLUS.